United States Patent
Ma (10) Patent No.: US 12,338,073 B2
(45) Date of Patent: Jun. 24, 2025

(54) OBJECT SORTING SYSTEM AND SORTING METHOD

(71) Applicant: BEIJING JINGDONG QIANSHI TECHNOLOGY CO., LTD., Beijing (CN)

(72) Inventor: Chenglong Ma, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 767 days.

(21) Appl. No.: 17/631,194

(22) PCT Filed: Apr. 22, 2020

(86) PCT No.: PCT/CN2020/086066
§ 371 (c)(1),
(2) Date: Jan. 28, 2022

(87) PCT Pub. No.: WO2021/036300
PCT Pub. Date: Mar. 4, 2021

(65) Prior Publication Data
US 2022/0267095 A1    Aug. 25, 2022

(30) Foreign Application Priority Data
Aug. 29, 2019  (CN) .......................... 201910807827.6

(51) Int. Cl.
| | |
|---|---|
| *B65G 1/08* | (2006.01) |
| *B07C 3/08* | (2006.01) |
| *B65G 1/04* | (2006.01) |
| *B65G 1/137* | (2006.01) |
| *B65G 33/04* | (2006.01) |

(52) U.S. Cl.
CPC .............. *B65G 1/1375* (2013.01); *B07C 3/08* (2013.01); *B65G 1/0492* (2013.01); *B65G 1/08* (2013.01);
(Continued)

(58) Field of Classification Search
CPC ...... B65G 1/1375; B65G 1/0492; B65G 1/08; B65G 33/04; B65G 1/1373; B07C 3/08; B66F 9/063
See application file for complete search history.

(56) References Cited

U.S. PATENT DOCUMENTS

| | | | |
|---|---|---|---|
| 9,908,696 B1 * | 3/2018 | Zevenbergen | G06Q 10/087 |
| 11,099,568 B2 * | 8/2021 | Tang | G05D 1/0212 |

(Continued)

FOREIGN PATENT DOCUMENTS

| | | | | |
|---|---|---|---|---|
| CN | 108423357 A | | 8/2018 | |
| CN | 108584268 A | * | 9/2018 | ........... B65G 1/0492 |

(Continued)

OTHER PUBLICATIONS

"Communication with Supplementary European Search Report", EP Application No. 20859235.2, Aug. 1, 2023, 8 pp.

(Continued)

*Primary Examiner* — Patrick H MacKey
(74) *Attorney, Agent, or Firm* — Myers Bigel, P.A.

(57) ABSTRACT

An object sorting system includes: a storage device configured to drive an object to be sorted in the storage device to move after an object moving-out instruction is received; a transport device configured to transport the object to be sorted; and a dispatching system configured to enable the transport device to move to the storage device where the object to be sorted is located according to a storage position of the object to be sorted in the storage device, so that the object to be sorted is driven to depart from the storage device and then falls to the transport device.

15 Claims, 4 Drawing Sheets

(52) U.S. Cl.
CPC ...... *B65G 33/04* (2013.01); *B65G 2203/0208* (2013.01)

(56) References Cited

U.S. PATENT DOCUMENTS

| | | | |
|---|---|---|---|
| 11,235,930 B2* | 2/2022 | Bastian, II | ........... B25J 15/0616 |
| 12,115,558 B2* | 10/2024 | Wang | ...................... B07C 3/003 |
| 2008/0277243 A1* | 11/2008 | Hayduchok | ............ B65G 1/065 |
| | | | 198/463.6 |
| 2019/0310655 A1* | 10/2019 | Voorhies | .............. G05D 1/0287 |

FOREIGN PATENT DOCUMENTS

| | | | | |
|---|---|---|---|---|
| CN | 108750511 | A | | 11/2018 |
| CN | 109018810 | A | | 12/2018 |
| CN | 109399037 | A | | 3/2019 |
| CN | 109573443 | A | | 4/2019 |
| CN | 109807067 | A | | 5/2019 |
| CN | 109878959 | A | | 6/2019 |
| CN | 110002158 | A | * 7/2019 | ........... B65G 1/0435 |
| CN | 110171660 | A | | 8/2019 |
| IT | TO990349 | A1 | | 10/2000 |
| JP | H03102004 | A | | 4/1991 |
| JP | H09263311 | A | | 10/1997 |
| JP | 2012158458 | A | | 8/2012 |

OTHER PUBLICATIONS

"Notice of Reasons for Refusal and English language translation", JP Application No. 2022-506233, Jan. 25, 2024, 8 pp.

* cited by examiner

OBJECT SORTING SYSTEM AND SORTING METHOD

CROSS-REFERENCE TO RELATED APPLICATIONS

The present application a U.S. National Stage Application under 35 U.S.C. § 371 of International Patent Application No. PCT/CN2020/086066, filed on Apr. 22, 2020, which is based upon and claims priority to Chinese Patent Application No. 201910807827.6, filed on Aug. 29, 2019, the entire contents of all of which are incorporated herein by reference.

TECHNICAL FIELD

The present disclosure relates to the technical field of logistics and warehousing, and in particular, to an objects sorting system and the sorting method.

BACKGROUND

In the current unmanned warehouses, an objects-to-person working mode is generally adopted, that is, the objects are placed in the objects shelf. After an upstream order is received, the dispatching system will dispatch an automated guided vehicle (AGV) according to a series of algorithms to transport different objects shelves in the warehouse to a preset sorting work position and then sort the required objects manually from the objects shelves.

SUMMARY

According to a first aspect of the present disclosure, an object sorting system is provided. The object sorting system includes:

a storage device, configured to drive an object to be sorted in the storage device to move after an object moving-out instruction is received;

a transport device, configured to transport objects; and a dispatching system, configured to enable the transport device to move to the storage device where the object to be sorted is located according to a storage position of each object to be sorted in the storage device, so that the object to be sorted is driven to depart from the storage device and then falls to the transport device.

In some embodiments, the object sorting system further includes:

a container, arranged on the transport device and configured to accommodate an object to be sorted falling from storage device.

In some embodiments, the object sorting system further includes:

an object detection part, arranged on an inner wall of the container near an opening and configured to detect whether the object to be sorted falls into container, wherein the dispatching system is configured to, according to the detection result of the object detection part, determine whether a number of objects falling into container from storage device is consistent with a number of pre-distributed objects, and determine that objects sorting of the current storage device is completed in a case of consistency.

In some embodiments, the object sorting system further includes:

a packing and re-checking platform, configured to pack and re-checking objects, wherein a plurality of storage devices are provided; and the dispatching system is configured to enable the transport device to move to a next storage device after objects sorting of one storage device is completed and in a case that the current sorting task is not completed, and enable the transport device to transport the objects to the packing and re-checking platform in a case that the current sorting task is completed.

In some embodiments, the storage device includes:

a shelf body, provided with a plurality of storage positions for storing objects, and the shelf body is provided with a parking space A below the bottom storage position and configured for the transport device to park when receiving objects; and a driving part, configured to drive the objects in the storage position to move after the object moving-out instruction is received.

In some embodiments, the driving part includes a plurality of independent driving units which are correspondingly arranged in each storage position and configured to drive the objects in the storage position to move, wherein the dispatching system is configured to control each driving unit to enable the required number of objects to be sorted to depart from the storage position.

In some embodiments, the shelf body includes:

a frame;

a plurality of partition plates, arranged along a height direction of the frame at intervals so as to divide the frame into a plurality of layers in the height direction; and a plurality of storage compartments, detachably arranged on each partition plate, wherein at least part of the storage compartments on each partition plate are arranged in parallel along a width direction of the shelf body, and an internal space of the storage position forms a storage position.

In some embodiments, the partition plate is provided with a guide groove extending along a thickness direction of the shelf body; and the storage compartment is configured to be inserted into the guide groove from one end of the guide groove.

In some embodiments, the shelf body includes a plurality of guide parts which are fixed in each storage position respectively. The driving unit includes:

a power component, provided with an output shaft and configured to output rotary motion;

a fixed wheel, coaxially connected to the output shaft of the power component; and a spiral part, sleeving outside the piece, wherein one end of the spiral part is connected to the fixed wheel, and configured to drive objects placed on the guide piece and located between adjacent spiral lines of the spiral part to move when the power component drives the fixed wheel to rotate.

In some embodiments, the storage device includes a double-sided objects shelf; a channel is formed in the storage device and configured to guide the falling objects; and the channel is located at the middle position of the double-sided objects shelf along a thickness direction.

According to a second aspect of the present disclosure, an object sorting method is provided. The object sorting method includes:

enabling a transport device to move to a storage device where an object to be sorted is located according to the storage position of the object to be sorted in the storage device; and enabling the storage device to drive the object to be sorted in the storage device to move in response to an object moving-out instruction, so that the object to be sorted is separated from the storage device and then falls to the transport device.

In some embodiments, the object sorting method further include: determining whether objects sorting of the current storage device is completed.

In some embodiments, the step of determining whether objects sorting in the current storage device is completed includes:

detecting whether the object to be sorted fall into a container on the transport device through an object detection part; and according to the detection result of the object detection part, determining whether a number of objects falling into container from the storage device is consistent with a number of pre-distributed objects, and determining that objects sorting of current storage device is completed in a case of consistency.

In some embodiments, a plurality of storage devices are provided, and the object sorting method further includes:

determining whether the current sorting task is completed after objects sorting of one storage device is completed, if the current sorting task is completed, enabling the transport device to transport the objects to a packing and re-checking platform, and if the current sorting task is not completed, enabling the transport device to move to the next storage device.

In some embodiments, the storage device includes: a shelf body and a driving part, wherein the shelf body is provided with a plurality of storage positions for storing objects; and the driving part includes a plurality of independent driving units which are correspondingly arranged in each storage position. The step of driving the object to be sorted to depart from the storage position includes:

starting the driving unit corresponding to the storage position where the object to be sorted is located; and controlling the driving unit to enable the required number of objects to be sorted to depart from the storage position.

In some embodiments, before the step of enabling the transport device to move to the transport device to the storage position where the object to be sorted is located, the object sorting method further includes:

distributing objects which need to be transported by the transport device for a single time according to the type and number of the objects to be sorted in an order.

In some embodiments, before the step of enabling the transport device to move to the storage device where the object to be sorted is located according to the storage position of the object to be sorted in the storage device, the object sorting method further includes:

determining the storage position of the object to be sorted; and planning a moving path of the transport device according to a position of the storage device corresponding to the object to be sorted.

BRIEF DESCRIPTION OF THE DRAWINGS

The accompanying drawings described herein are configured to provide further understanding of the present application and constitute a part of the present disclosure. The schematic embodiments of the present disclosure and the description thereof are configured to explain the present disclosure, but do not constitute an inappropriate limitation to the present disclosure. In the accompanying drawings.

DESCRIPTION OF REFERENCE NUMERALS 1. storage device; 11. frame; 12. partition plate; 121. guide groove; 13. storage compartment; 14. fixed wheel; 141. sleeve portion; 142. mounting portion; 1421. ring groove; 1422. limiting portion; 1423. hole; 15. guide piece; 16. spiral part; 17. power component; 2. transport device; 21. hook; 3. container; 4. reflecting plate; 5. through-beam sensor; B. object detection part; C. shelf body; D. driving unit; 6. dispatching system; 7. packing and re-checking platform.

DETAILED DESCRIPTION

The present disclosure is described hereinafter in detail. In the following paragraphs, different aspects of the embodiments are defined in detail. The aspects defined may be combined with one or more of any other aspects unless it is explicitly pointed that they cannot be combined. In particular, any features considered to be preferred or favorable may be combined with one or more of other features considered to be preferred or favorable combination.

The terms "first", "second" and the like appearing in the present disclosure are only configured to facilitate description so as to distinguish different components with the same name, but not to represent a sequence or a primary and secondary relationship.

In the description of the present disclosure, it should be understood that an azimuth or position relationship indicated by terms "upper", "lower", "top", "bottom", "front", "rear", "inner" and "outer" and the like is an azimuth or position relationship based on the accompanying draws, which is only for convenient description of the present disclosure, but not indicates or implies that the referred device must have a specific azimuth and perform construction and operation in the specific azimuth; therefore, it cannot be interpreted as a limitation to the protection scope of the present disclosure.

In related art known by the inventor, objects shelves generally have double-sided storage spaces, each side of storage space is divided into a plurality of layers, each layer of storage space is internally provided with different storage compartments, and the storage compartments are configured to store objects. After the upstream order is received, the dispatching system will specifically position the objects in the order to the storage compartment of the objects shelf according to a series of algorithms and then inform AGV to arrive at the storage position. The objects shelf is consigned by the AGV to arrive at the sorting work position, and different objects in the different storage compartments are sorted into the container manually according to the prompt of the computer interface. If there are objects needing to be sorted on the other side of the objects shelf, the AGV needs to perform the side-changing task, and then objects in the storage compartment on the other side are manually sorted until the objects required by the container are sorted. The container is placed on a transporting line and is transported to the re-checking platform for packing and re-checking.

This sorting method at least has one of the following disadvantages:

1. Manual participation is required, and the objects shelves are generally high. The objects in the high-level storage compartments need to be sorted manually with the help of tools such as ladders.

2. For double-sided objects shelves, there are often objects on both sides that need to be sorted, so the AGV needs to frequently consign the objects shelves to perform the task of changing sides, and also needs to ensure that they do not collide with other objects when changing sides.

3. When the AGV consigns the objects shelf, the AGV often deviates from the guide line due to the deviation of the center of gravity of the objects shelf, and it is also easy to collide with other objects during driving. Moreover, the height and weight of the objects shelf are relatively large. From a safety perspective, it is necessary to restrict the driving speed of the AGV.

4. After sorting of the current objects shelf is completed, it is necessary to further determine whether the objects shelf should return to the warehouse or go to another sorting work location. The management of the objects shelf is complicated.

The shortcomings of the above-mentioned sorting methods will reduce the efficiency of sorting objects in the warehouse.

In view of this, the embodiments of the present disclosure provide an object sorting system and a sorting method, which can improve the sorting efficiency.

In the object sorting system according to the embodiments of the present disclosure, the storage device can move out objects placed therein, and the dispatching system enables the transport device to move to the storage device where the object to be sorted is located according to the storage position of the object to be sorted in the storage device, so that the object to be sorted is driven to depart from the storage device and then falls to the transport device, thereby realizing objects sorting. Through cooperation of the storage device with a function of automatically moving out of objects and the transport device, the system can automatically sort the objects so as to omit the manual sorting link; and the transport device does not need to carry the storage device, so that the sorting process can be simplified, the objects sorting efficiency can be improved, and the safety in the sorting process can be enhanced.

As shown in FIG. 1 to FIG. 5 and FIG. 8, in some embodiments, the present disclosure provides an object sorting system, including: a storage device 1, a transport device 2 and a dispatching system 6.

Figure 1:
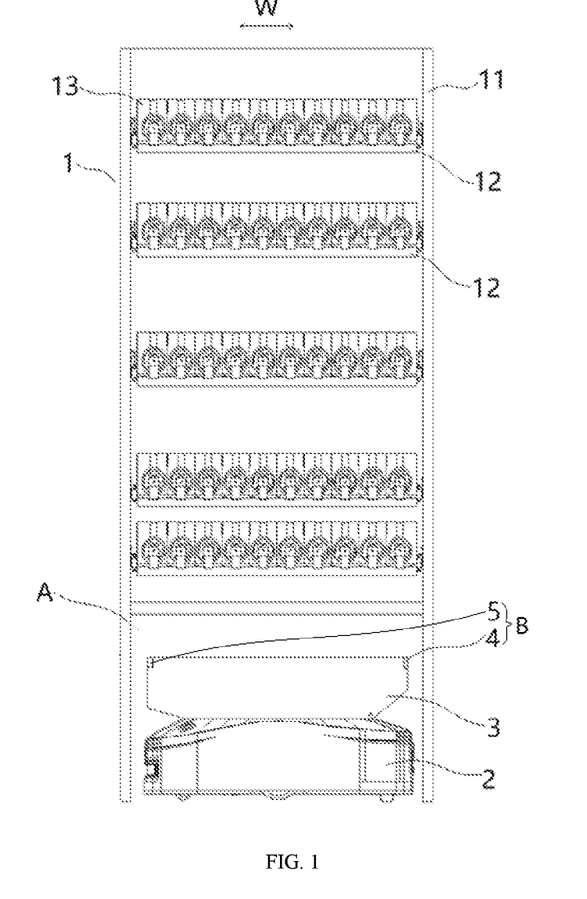
FIG. 1 is a structural schematic diagram of some embodiments of an object sorting system according to the present disclosure.

The storage device 1 is configured to store objects and may be arranged in a warehouse of a logistics system, for example an unmanned warehouse. The warehouse may be internally provided with a plurality of storage devices 1. The storage device 1 may be an objects shelf device, has a function of moving an object to be sorted placed therein, and can drive the object to be sorted in the storage device 1 to move after an object moving-out instruction is received.

The transport device 2 is configured to transport objects. The transport device 2 may be an AGV. The AGV is provided with an electromagnetic or optical automatic guide device and can travel along a specified guide path according to the path planned by the dispatching system 6, and the path is more flexible when the AGV moves among different storage devices 1; or the transport device 2 may also be a rail guided vehicle (RGV) and can travel along a preset track; or the transport device 2 may also be a robot and the like.

Figures 8, 9:
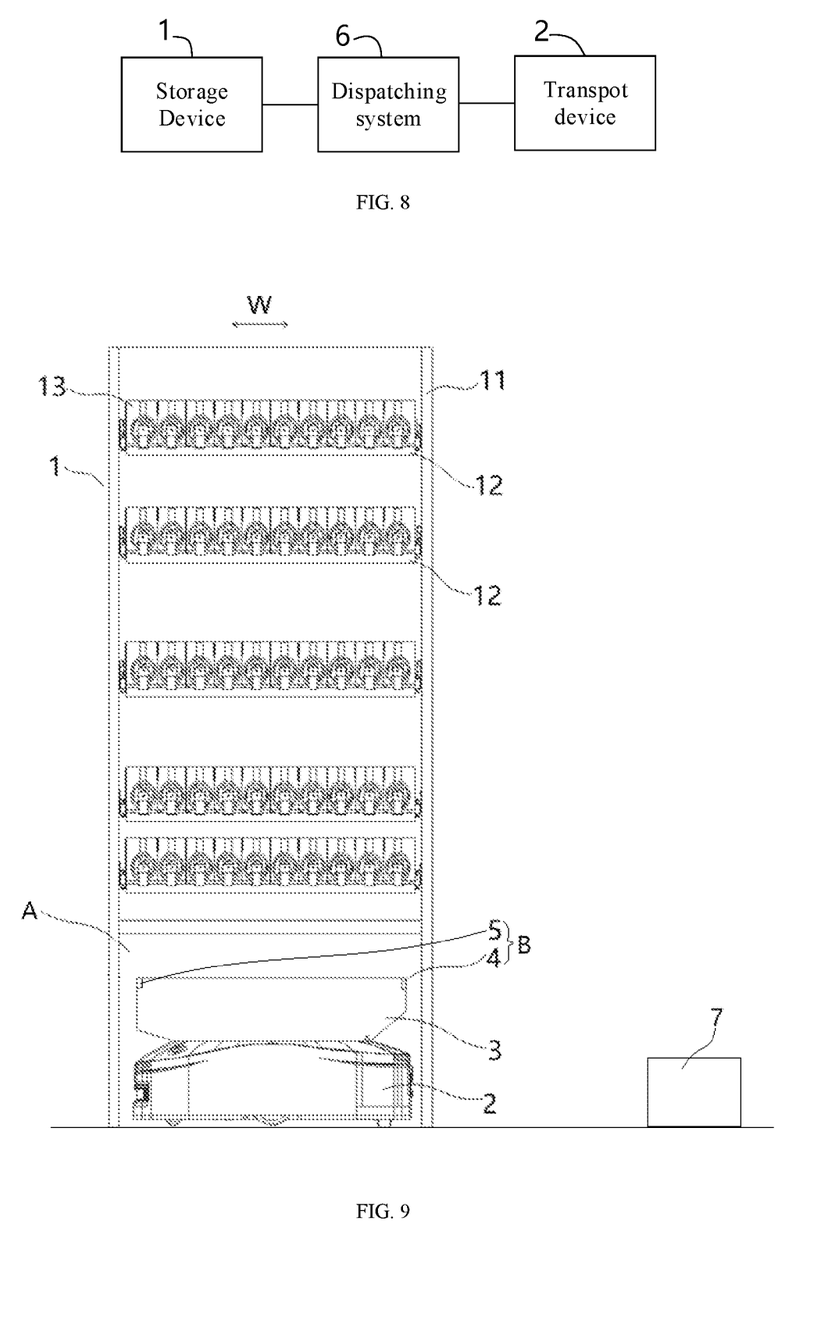
FIG. 8 is a schematic diagram of module composition of some embodiments of an object sorting system according to the present disclosure.
FIG. 9 is a structural schematic diagram of some other embodiments of an object sorting system according to the present disclosure.

The dispatching system 6 is configured to enable the transport device 2 to move to the storage device 1 where the object to be sorted is located according to a storage position of the object to be sorted, so that the object to be sorted is driven to depart from the storage device 1 and then falls to the transport device 2, thereby realizing objects sorting. for example, in a logistics system, the object to be sorted may be an object to be sorted in an order, or may also be an object to be sorted determined according to a preset task target.

After the transport device 2 moves to the storage device 1 where the object to be sorted is located, the dispatching system 6 may transmit an object moving-out instruction to the storage device 1, so that the storage device 1 drives the object to be sorted to depart from the storage device 1. This mode may realize automatic sorting, so that the whole sorting process is smoother and the sorting efficiency is improved. Or after the transport device 2 move to the storage device 1 where the object to be sorted is located, a button on the storage device 1 may be triggered, so that the storage device 1 receives the object moving-out instruction.

For example, when it is necessary to sort the object to be sorted in the order and before the transport device 2 arrives at the storage device 1, the dispatching system 6 needs to determine the storage position of each object to be sorted in the order so as to determine the position of the storage device 1 where the object to be sorted is located and plane the moving path of the transport device 2. Furthermore, the dispatching system 6 is further configured to distribute objects which needs to be transported by the transport device 2 for a single time according to the types and number of the objects to be sorted in the order. The objects which need to be transported by the transport device 2 for a single time may only include objects in one order, or may also include objects in a plurality of orders, which needs to be determined according to the size and number of the objects in the order.

According to the embodiments of the present disclosure, through cooperation of the storage device 1 with a function of automatically moving out objects and the transport device 2, objects can be automatically sorted, it is unnecessary to carry the storage device 1 such as the objects shelf to a manual sorting site by the transport device 2, the manual sorting link is omitted, it is unnecessary to carry the storage device 1 such as the objects shelf by the transport device 2, the sorting process can be simplified, and the sorting efficiency in the warehouse can be improved. Furthermore, since the transport device 2 does not need to carry the storage device such as the objects shelf in the sorting process and can directly transport objects, the gravity center of the transport device 2 during driving can be reduced, and it is not prone to inclining the vehicle or deviating the guide piece due to unbalance loading. The guide piece may be a guide line or a track arranged on the ground, so that the safety of transporting objects can be improved.

As shown in FIG. 1, the object sorting system provided by the present disclosure may further include a container 3, which is arranged on the transport device 2 and is configured to accommodate object to be sorted falling from the storage device 1. The container 3 is arranged on the transport device 2, object to be sorted can be stored better, the object to be sorted can be prevented from falling on the ground and being damaged, or missing of the object to be sorted in the objects sorting process can be avoided.

Specifically, the container 3 may be manually placed on the transport device 2, and the container 3 may be automatically carried on the transport device 2 through a transfer device such as a belt transporting part, so that the automation degree of the sorting process can be further increased. In order to prevent the objects from being concentrated at the specific position when falling into the container 3, a guide structure tapering from top to bottom may be arranged at the bottom of the container 3, so that the objects can be placed in the container 3 uniformly.

Further, as shown in FIG. 1, the object sorting system provided by the present disclosure may further include: an object detection part B, which is arranged on an inner wall of the container 3 near an opening and configured to detect whether the object to be sorted falls into container 3. For example, the object detection part B may include a reflecting plate 4 arranged on one side wall of the container 3, and a through-beam sensor 5 arranged on an opposite side wall. The reflecting plate 4 may emit light which can be received by the through-beam sensor 5. When objects fall into the container 3, the light will be cut off, so that a detection signal that objects fall into the container 3 is sent out. Alternatively, the article detection part B may include a photoelectric through-beam tube arranged on two opposite side wall of the container 3.

In the process of sorting objects by a certain storage device 1, the dispatching system 6 is configured to determine whether a number of objects falling into the container 3 from the storage device 1 is consistent with a number of pre-distributed objects according to the detection result of the object detection part B, and determine that objects sorting of the current storage device 1 is completed in a case of consistency, and the transport device 2 can leave the current storage device 1, and determine that objects sorting of the current storage device 1 is not complete in a case of inconsistency.

This embodiment can accurately determine whether the current storage device 1 has completed objects sorting and finally determine whether the current sorting task is completed, so that the sorting accuracy can be improved, and the situation that missing or excessive quantity of objects which are moved out can be avoided. Meanwhile, the storage device 1 may also determine whether to complete the objects moving-out task. The determination result of the storage device 1 and the determination result of the object detection part B may be checked mutually, so that whether the objects sorting is completed can be determined more accurately.

In some embodiments, as shown in FIG. 9, the object sorting system provided by the present disclosure may further include: a packing and re-checking platform 7 for packing and re-checking objects. A plurality of storage devices 1 are provided. The dispatching system 6 is configured to enable the transport device 2 to move to a next storage device 1 after objects sorting of one storage device 1 is completed and in a case that the current sorting task is not completed, and transport the transport device 2 to the packing and re-checking platform 7 in a case that the current sorting task is completed.

This embodiment can receive objects sorted by each storage device 1 in the current sorting task by moving the transport device 2, can automatically complete sorting of all objects in the current sorting task, can flexibly complete the sorting task without carrying the storage device 1, and can improve the objects sorting efficiency and reliability.

Figure 2:
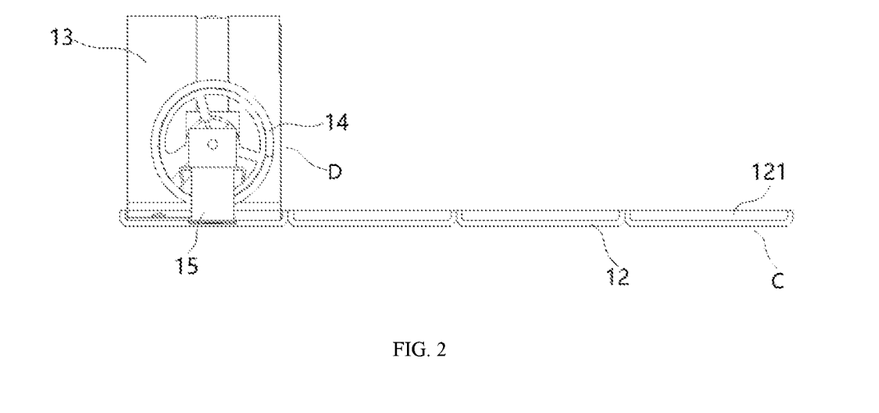
FIG. 2 is a structural schematic diagram of some embodiments that a storage compartment is inserted into a guide groove on a partition plate in the storage device according to the present disclosure.

As shown in FIG. 1 and FIG. 2, the storage device 1 includes: a shelf body C and a driving part. The shelf body C is provided with a plurality of storage positions for storing objects. The same or different objects may be placed in each storage position. For example, each storage position in the shelf body C may be provided with a plurality of layers in a height direction. Each layer is provided with a plurality of storage positions in parallel along a width direction (a W direction in FIG. 1) of the shelf body. The shelf body C is provided with two rows of storage positions in a thickness direction to form a double-sided objects shelf, or may be provided with a plurality of rows of storage positions in the thickness direction. The shelf body is provided with a parking space A below the bottom storage position for the transport device 2 to park to receive objects. The driving part is configured to drive the objects in the storage position to move after the object moving-out instruction is received.

The dispatching system 6 is configured to enable the transport device 2 to move to the parking space A below the storage device 1 where the object to be sorted is located according to the storage position of the object to be sorted in the order, and enable the driving part to drive the object to be sorted to depart from the storage position to fall on the transport device 2, thereby realizing objects sorting.

In the process of sorting objects by the storage device 1, the transport device 2 is located at the bottom of the storage device 1 and can be prevented from colliding with other transport devices traveling in the site. When the storage device 1 is a double-sided objects shelf, it can prevent the transport device 2 from being frequently switched between two sides of the storage device 1, thereby improving the safety of the sorting process.

In this embodiment, the driving part may include a plurality of independent driving units D which are correspondingly arranged in each storage position and configured to drive the objects in the storage position to move. The dispatching system 6 is configured to control the working time or working parameter of each driving unit D, so that the required number of objects to be sorted can depart from the storage position. For example, when the driving part includes a motor, the required number of objects to be sorted can depart from the storage position by controlling the rotation time and the rotation turns of the motor.

This embodiment can independently control the moving out of the objects in each position, and can flexibly move out the objects in the specific storage position. The same objects may be placed in the same storage position, so it is beneficial to control the types and number of the removed objects. Optionally, a plurality of storage positions may share one driving part, and the driving part is provided with a plurality of output ends or the output ends may realize position switching, so that objects in different storage positions can move out.

As shown in FIG. 1, the shelf body includes: a frame 11, a plurality of partition plates 12 and a plurality of storage compartments 13. The partition plates 12 are arranged along a height direction of the frame 11 at intervals so as to divide the frame 11 into a plurality of layers in the height direction, and a distance between the adjacent partition plates 12 may be set according to the height of the objects; each storage compartment 13 may be detachably arranged on each partition plate 12, at least part of storage compartments 13 on each partition plate 12 are arranged in parallel along a width direction of the shelf body, an internal space of each storage compartment 13 forms a storage position, and an end face of each storage compartment 13 may be of a U-shaped or rectangular structure. For a single-sided objects shelf, the storage compartments 13 on each partition plate 12 are arranged in parallel along the width direction of the shelf body; and for a double-sided objects shelf, two rows of storage compartments 13 are arranged on each partition plate 12 in the thickness direction.

In this embodiment, a detachable storage compartment 13 is provided, objects may be put into the storage compartment 13 when the storage compartment 13 is disassembled, and the storage compartment 13, together with the objects, are mounted on the partition plate 12, so that there is a sufficient operating space, it is convenient for the high storage compartment 13 to load, and the loading efficiency can be improved.

As shown in FIG. 2, the partition plate 12 is provided with a guide groove 121 extending along the thickness direction of the shelf body C. The storage compartment 13 can be inserted into the guide groove 121 from one end of the guide groove 121. For example, the guide groove 121 may be U-shaped and cover the bottom area of the storage compartment 13. Through the guide groove 121, the storage compartment 13 can disassembled and assembled conveniently in an inserting-pulling form, and the storage compartment 13 can be positioned.

Further, the driving part includes a plurality of driving units D which are arranged corresponding to each storage compartment 13. The driving unit D is provided with a first electrical interface, the frame 11 is provided with a second electrical interface at a position corresponding to each storage compartment 13, and the first electrical interface and the second electrical interface form a quick-plug interface for supplying power for the driving unit D and providing at least one of control signals. When the storage compartment 13 is mounted in place, the quick-plug interface is connected in place. For example, the first electrical interface may be a plug and the second electrical interface is a jack; or the first electrical interface may be a jack and the second electrical interface is a plug; or the first electrical interface and the second electrical interface are both plugs, which are connected through a buckle.

In this embodiment, the mounting of the storage compartment 13 and the electrical connection of the driving unit D can be completed through the same operation, so the connection and disconnection links are omitted. Under the condition that the space in the storage device 1 is designed to be relatively compact, the assembling and disassembling efficiency of the storage compartment 13 can be improved.

Figure 3:
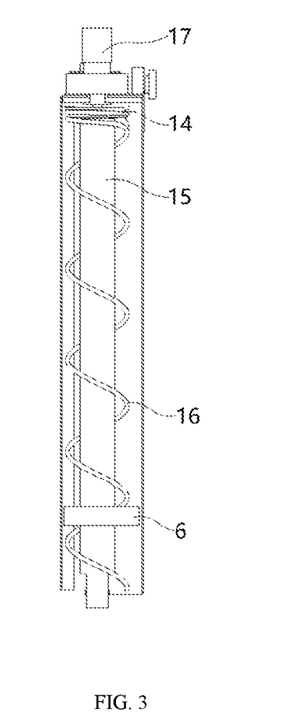
FIG. 3 is a structural schematic diagram of some embodiments of a driving unit in a storage device according to the present disclosure.

As shown in FIG. 2 and FIG. 3, the shelf body C includes a plurality of guide parts 15, which are fixed in each storage position respectively along the thickness direction of the shelf body C, for example, the guide parts 15 may be parallel with the bottom surface of the storage compartment 13 and fixed in the storage compartment 13. The guide piece 15 may be of a long strip plate-shaped structure. An end part of the guide piece 15 may be bent downwards to be fixed to the storage compartment 13. The driving unit D includes: a power component 17, a fixed wheel 14 and a spiral part 16.

Figure 4:
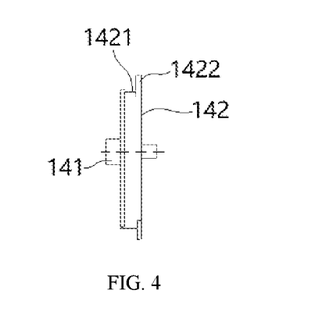
FIG. 4 is a side view of some embodiments of a fixed wheel in a driving unit in a storage device according to the present disclosure.
Figure 5:
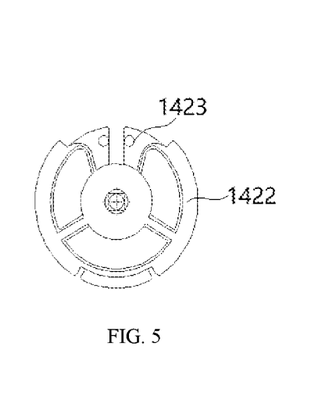
FIG. 5 is a front view of some embodiments of a fixed wheel in a driving unit in a storage device according to the present disclosure.

The power component 17 is provided with an output shaft and configured to output rotary motion. For example, the power component 17 may be an electric machine or motor; the fixed wheel 14 may be arranged at one end of the storage compartment 13 and is coaxially connected to the output shaft of the power component 17; and as shown in FIG. 4, the fixed wheel 4 includes a sleeve portion 141 and a mounting portion 142 connected to one ed of the sleeve portion 141, and the output shaft of the power component 17 is inserted into the sleeve portion 141 and is locked through a jackscrew. The spiral part 16, such as a spring, is sleeved outside the guide piece 15 along a length direction of the guide piece 15, and the guide piece 15 may guide the spiral part 16. One end of the spiral part 16 is connected to the fixed wheel 14, for rotating the spiral part 16 when the power component 17 drives the fixed wheel 14 to rotate, so that the objects placed on the guide piece 15 and located between the adjacent spiral lines of the spiral part 16 can be driven to move. As shown in FIG. 4, the mounting portion 142 is provided with a ring groove 1421 at the middle position along the thickness direction, two ends of the ring groove 1421 are provided with limiting portions 1422, and one end of the spiral part 16 is sleeved in the ring groove 1421. As shown in FIG. 5, the fixed wheel 14 is provided with a hole 1423 for fixing the spiral part 16.

The same type of objects are stored in each storage position. The dispatching system 6 is configured to control the power component 17 to drive the spiral part 16 to rotate in a preset number of turns according to the number of the object to be sorted in the order, so that the required number of object to be sorted are separated from the storage position. In this way, the number of the object to be sorted separated from the storage position can be accurately controlled. Alternatively, the dispatching system 6 may control the rotation turns of the power component 17 to enable the required number of objects to be sorted to depart from the storage position.

In order to enable the object to be sorted separated from the storage position to smoothly fall into the container 3 and prevent the object to be sorted from being damaged, the storage device 1 is internally provided with a channel for guiding the falling objects. Each storage position communicates with an inlet end of the channel, and the container 3 needs to be aligned with an outlet end of the channel.

If the storage device 1 includes a double-sided objects shelf, the storage device 1 is provided with a channel for guiding the falling objects, and the channel is located at the middle position of the double-sided objects shelf along the thickness direction, so that when the object to be sorted in the double-sided storage area fall down, the objects can directly fall into the container 3 without adjusting the position of the transport device 2.

According to the object sorting system provided by the embodiments of the present disclosure, a mode of automatically sorting by the transport device 2 is provided. The transport device 2 does not need to carry the storage device 1, and a storage device 1 with a function of automatically moving out the objects is adopted. The dispatching system 6 informs the transport device 2 to take the container 3 to the storage device 1 for sorting, and enables the power component in the storage compartment 13 where the object to be sorted is located to push the corresponding number of object to be sorted into the container 3. The object detection part B may detect the number of the object to be sorted falling into the container 3 and check the number of the objects by communicating with the dispatching system 6. After sorting of each storage device 1 is completed, the dispatching system 6 will be requested to inquire the details of the sorting task. If it is necessary to continue sorting, the dispatching system 6 will calculate the next storage device 1 requiring sorting. If the current sorting task is completed, the transport device will directly transport the objects to the packing and re-checking platform 7 for re-checking and packing to complete delivery.

This object sorting system can completely release manpower and realize fully-automatic operation of sorting. Moreover, after each storage device 1 completes sorting, the optimal storage device 1 is planned in real time, so that it is ensured that the whole process is in the optimal sorting solution, various abnormalities caused by that the storage device 1 is carried during production can be avoided, and the traveling speed of the transport device 2 can be increased, thereby improving the working efficiency of the transport device 2, further improving the delivery efficiency of the warehouse, and avoiding the situation that the high-level objects need to be sorted manually by means of ladders.

Figure 6:
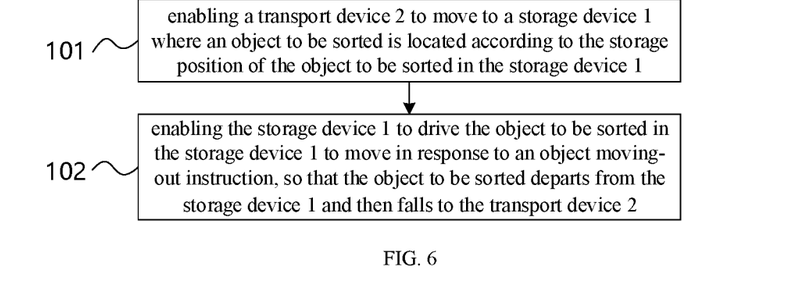
FIG. 6 is a schematic flowchart of some embodiments of an object sorting method according to the present disclosure.

Secondly, the present disclosure provides a sorting method based on the object sorting system in this embodiment. In some embodiments, as shown in the flow schematic diagram in FIG. 6, the sorting method includes:

step 101: enabling a transport device 2 to move to a storage device 1 where the object to be sorted is located according to the storage position of the object to be sorted in the storage device 1, wherein the storage position of the object to be sorted in the storage device 1 may be pre-stored in a dispatching system 6. For example, in a logistics system, the object to be sorted may be an object to be sorted in an order, or may also be an object to be sorted determined according to a preset task target.

Step 102: enabling the storage device 1 to drive the object to be sorted to depart from the storage device 1 in response to an object moving-out instruction so as to fall to a transport device 2.

The step 101 and the step 102 are performed sequentially, and the step 101 may be performed by the dispatching system 6. According to the sorting method, objects can be automatically sorted, it is unnecessary to carry the storage device 1 such as the objects shelf to a manual sorting site by the transport device 2, the manual sorting link is omitted, it is unnecessary to carry the storage device 1 such as the objects shelf by the transport device 2, the sorting process can be simplified, and the sorting efficiency of the objects in the warehouse can be improved. Furthermore, since the transport device 2 does not need to carry the storage device 1 such as the objects shelf in the sorting process and can directly transport objects, the gravity center of the transport device 2 during driving can be reduced, and it is not prone to inclining the vehicle or deviating the guide piece due to unbalance loading. The guide piece may be a guiding line or a track arranged on the ground, so that the safety of transporting objects can be improved.

Figure 7:
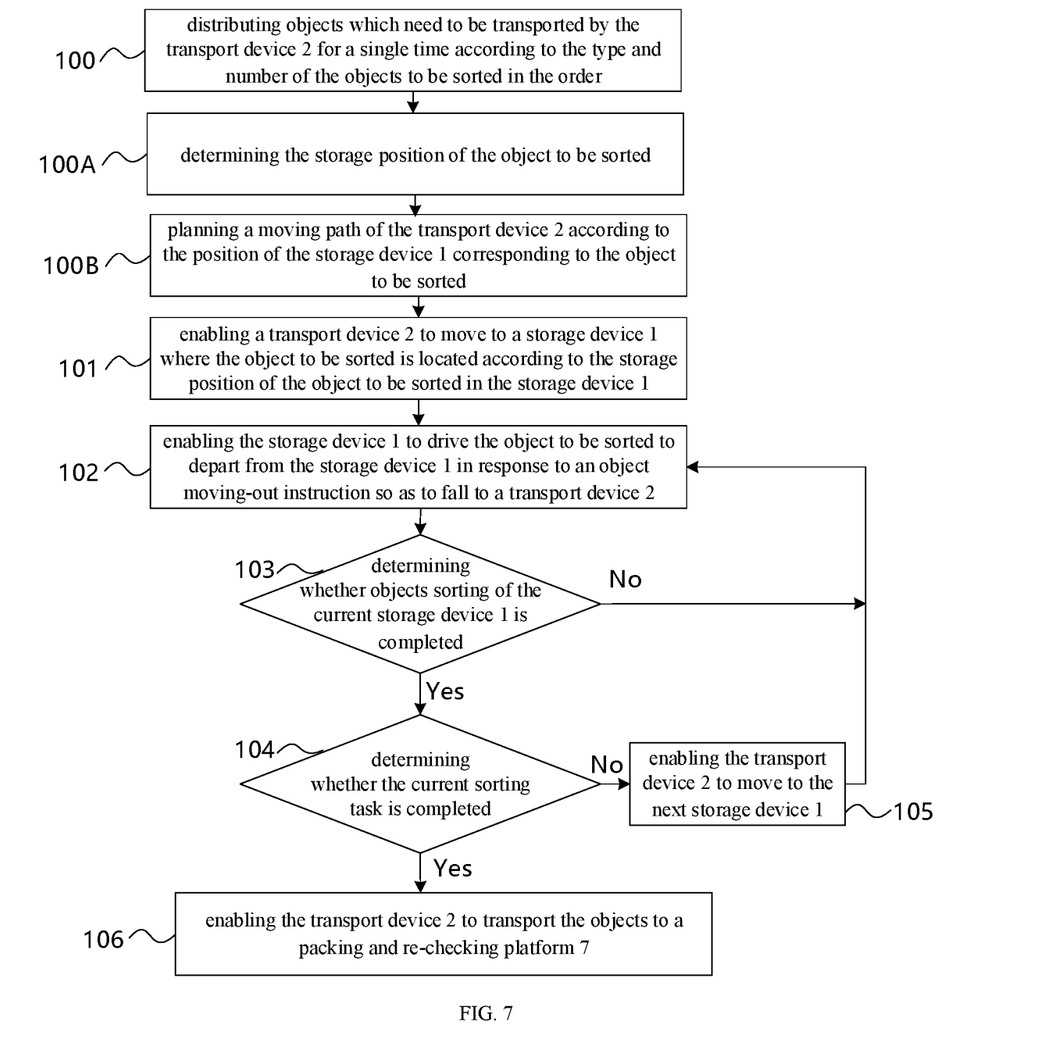
FIG. 7 is a schematic flowchart of some other embodiments of an object sorting method according to the present disclosure.

In some other embodiments, as shown in the flow schematic diagram in FIG. 7, the sorting method provided by the present disclosure may further includes:

step 103: determining whether objects sorting of the current storage device 1 is completed.

Step 103 may be performed after the object to be sorted is separated from the storage position, or may also be performed after the dispatching system 6 completes the action of each driving unit corresponding to the object to be sorted, and the timing when the transport device 2 leaves the current storage device 1 can be determined.

Further, the step 103 of determining whether objects sorting in the current storage device 1 is completed specifically includes:

step 103A: detecting whether the object to be sorted fall into a container 3 on the transport device 2 through an object detection part B; and step 103: according to the detection result of the object detection part B, determining whether a number of objects falling into container 3 from the storage device 1 is consistent with a number of pre-distributed objects, and if the number of objects falling into container 3 from the storage device 1 is consistent with the number of pre-distributed objects, it is determined that objects sorting of the current storage device 1 is completed, otherwise, it is determined that the objects sorting in the current storage device 1 is not completed. The step 103A and the step 103B are not shown in the figure.

This embodiment can accurately judge whether the current storage device 1 has completed objects sorting and finally determine whether the current sorting task is completed, so that the sorting accuracy can be improved, and the situation that missing or excessive quantity of objects which are moved out can be avoided. Meanwhile, the storage device 1 may also determine whether to complete the objects moving-out task. The determination result of the storage device 1 and the determination result of the object detection part B may be checked mutually, so that whether the objects sorting is completed can be determined more accurately.

In some other embodiments, a plurality of storage devices 1 are provided. As shown in the flow schematic diagram in FIG. 7, after objects sorting in one storage device 1 is completed, the sorting method provided by the present disclosure may further includes:

step 104: determining whether the current sorting task is completed, if the current sorting task is completed, step 106 is performed, otherwise, step 105 is performed;

step 105: enabling the transport device 2 to move to the next storage device 1; and step 106: enabling the transport device 2 to transport the objects to a packing and re-checking platform 7.

This embodiment can receive objects sorted by each storage device 1 in the current sorting task by moving the transport device 2, can automatically complete sorting of all objects in the current sorting task, can flexibly complete the sorting task without carrying the storage device 1, and can improve the objects sorting efficiency and reliability.

In some embodiments, the storage device 1 includes a shelf body C and a driving part, wherein the shelf body C is provided with a plurality of storage positions for storing objects; and the driving part includes a plurality of driving units D which are correspondingly arranged in each storage position. The step 102 of driving the object to be sorted to depart from the storage device 1 specifically includes:

starting the driving unit D corresponding to the storage position where the object to be sorted is located; and controlling the driving unit D independently to enable the required number of objects to be sorted to depart from the storage position.

For example, the dispatching system 6 may control the power component 17 to drive the spiral part 16 to rotate in a preset number of turns according to the number of the object to be sorted in the order, or control the rotation turns of the power component 17 to enable the required number of objects to be sorted to depart from the storage position, thereby controlling the sorting process flexibly and accurately.

In some embodiments, as shown in the flow schematic diagram in FIG. 7, before the step of enabling the transport device 2 to move to the storage device 1 where the object to be sorted is located, the sorting method provided by the present disclosure may further includes:

step 100: distributing objects which need to be transported by the transport device 2 for a single time according to the type and number of the objects to be sorted in the order.

The objects which need to be transported by the transport device 2 for a single time may be objects in one order or a plurality of orders. After the objects are transported to the packing and re-checking platform 7, it is also necessary to re-check the objects, split the objects which are transported according to the order for a single time or pack the objects. By distributing the objects which needs to be transported by the transport device 2 for a single time in advance, the accommodating capacity of the container 3 can be completely utilized, the transporting efficiency of the objects can be improved, and the re-checking and packing operation after sorting can be facilitated.

In some embodiments, before the step of enabling the transport device 2 to move to the storage device 1 where the object to be sorted is located according to the storage position of the object to be sorted in the storage device 1, the sorting method may further include:

step 100A: determining the storage position of the object to be sorted, for example, the storage device 1 where each object to be sorted is located in the order and the specific storage position may be determined.

Step 100B: planning a moving path of the transport device 2 according to the position of the storage device 1 corresponding to the object to be sorted.

The step 100B is performed after the step 100A. In the step 100B, before the transport device 2 arrives at the storage device 1, all the moving paths of the transport device 2 arriving at each storage device 1 are planned, or after the sorting of one storage device 1 is completed, the moving path of the next storage device 1 is dynamically planned. The sequence of the steps 100, 100A and 100B is not limited.

In the above steps, the steps except the steps 102 and 103A may be performed by the dispatching system 6.

The object sorting system and the sorting method provided by the present disclosure are introduced in detail. The principle and embodiments of the present disclosure are elaborated by specific embodiments, and the description of the above embodiments is only intended to help understand the method of the present disclosure and the core concept thereof. It should be pointed out that for those of ordinary skill in the technical field, several improvements and modifications may be made to the present disclosure without departing from the principle of the present disclosure, and these improvements and modifications should fall within in the protection scope of the claims of the present disclosure.

The invention calimed is:

1. An object sorting system, comprising:
a storage device configured to drive an object to be sorted in the storage device to move after an object moving-out instruction is received;
a transport device configured to transport the object to be sorted;
a dispatching system configured to enable the transport device to move to the storage device where the object to be sorted is located according to a storage position of the object to be sorted in the storage device so that the object to be sorted is driven to depart from the storage device and then falls to the transport device; and
a packing and re-checking platform configured to pack and re-check objects;
wherein a plurality of storage devices are provided, and the dispatching system is configured to enable the transport device to move to a next storage device after objects sorting of one storage device is completed and in a case that a current sorting task is not completed, and enable the transport device to transport the objects to the packing and re-checking platform in a case that the current sorting task is completed.

2. The object sorting system according to claim 1, further comprising:
a container arranged on the transport device and configured to accommodate the object to be sorted falling from the storage device.

3. The object sorting system according to claim 2, further comprising:
an object detection part arranged on an inner wall of the container adjacent to an opening and configured to detect whether the object to be sorted falls into the container, and
wherein the dispatching system is configured to, according to the detection result of the object detection part, determine whether a number of objects falling into the container from the storage device is consistent with a number of pre-distributed objects, and determine that objects sorting of the current storage device is completed in a case of consistency.

4. The object sorting system according to claim 1, wherein the storage device comprises:
a shelf body provided with a plurality of storage positions for storing objects, wherein the shelf body is provided with a parking space below the bottom storage position and configured for the transport device to park when receiving objects; and
a driving part configured to drive the objects in the storage position to move after the object moving-out instruction is received.

5. The object sorting system according to claim 4, wherein the driving part comprises a plurality of independent driving units which are correspondingly arranged in each storage position and configured to drive the objects in the storage position to move,
wherein the dispatching system is configured to control each driving unit to enable the required number of objects to be sorted to depart from the storage position.

6. The object sorting system according to claim 5, wherein the shelf body comprises a plurality of guide parts which are fixed in each storage position respectively; and the driving unit comprises:
a power component provided with an output shaft and configured to output rotary motion;
a fixed wheel coaxially connected to the output shaft of the power component; and
a spiral part sleeving outside the guide piece, one end of the spiral part being connected to the fixed wheel, and configured to drive objects placed on the guide piece and located between adjacent spiral lines of the spiral part to move when the power component drives the fixed wheel to rotate.

7. The object sorting system according to claim 4, wherein the shelf body comprises:
a frame;
a plurality of partition plates arranged along a height direction of the frame at intervals so as to divide the frame into a plurality of layers in the height direction; and
a plurality of storage compartments detachably arranged on each partition plate, at least part of the storage compartments on each partition plate being arranged in parallel along a width direction of the shelf body, and an internal space of the storage compartment forming the storage position.

8. The object sorting system according to claim 7, wherein the partition plate is provided with a guide groove extending along a thickness direction of the shelf body; and the storage compartment is configured to be inserted into the guide groove from one end of the guide groove.

9. The object sorting system according to claim 1, wherein the storage device comprises a double-sided objects shelf; a channel is formed in the storage device to guide the falling objects; and the channel is located at the middle position of the double-sided objects shelf along a thickness direction.

10. An object sorting method, comprising:

enabling a transport device to move to a storage device where an object to be sorted is located according to the storage position of the object to be sorted in the storage device;

enabling the storage device to drive the object to be sorted in the storage device to move in response to an object moving-out instruction, so that the object to be sorted departs from the storage device and then falls to the transport device; and wherein a plurality of storage devices are provided, determining whether a current sorting task is completed after objects sorting of one storage device is completed, if the current sorting task is completed, enabling the transport device to transport the objects to a packing and re-checking platform, and if the current sorting task is not completed, enabling the transport device to move to the next storage device.

11. The object sorting method according to claim 10, further comprising: determining whether objects sorting of the current storage device is completed.

12. The object sorting method according to claim 11, wherein the step of determining whether objects sorting in the current storage device is completed comprises:

detecting whether the object to be sorted fall into a container on the transport device through an object detection part; and according to the detection result of the object detection part, determining whether a number of objects falling into the container from the storage device is consistent with a number of pre-distributed objects, and determining that objects sorting of current storage device is completed in a case of consistency.

13. The object sorting method according to claim 10, wherein the storage device comprises: a shelf body and a driving part; the shelf body is provided with a plurality of storage positions for storing objects; the driving part comprises a plurality of independent driving units which are correspondingly arranged in each storage position; and the step of driving the object to be sorted to depart from the storage position comprises:

starting the driving unit corresponding to the storage position where the object to be sorted is located, and controlling the driving unit to enable the required number of objects to be sorted to depart the storage position.

14. The object sorting method according to claim 10, wherein before the step of enabling the transport device to move to the storage position where the object to be sorted is located, the object sorting method further comprises:

distributing objects which need to be transported by the transport device for a single time according to the type and number of the objects to be sorted in an order.

15. The object sorting method according to claim 10, wherein before the step of enabling the transport device to move to the storage device where the object to be sorted is located according to the storage position of the object to be sorted in the storage device, the object sorting method further comprises:

determining the storage position of the object to be sorted; and planning a moving path of the transport device according to a position of the storage device corresponding to the object to be sorted.

* * * * *